United States Patent
Kataoka et al.

(10) Patent No.: US 7,868,504 B2
(45) Date of Patent: Jan. 11, 2011

(54) RESOLVER

(75) Inventors: Nakaba Kataoka, Kyoto (JP); Keita Nakanishi, Kyoto (JP)

(73) Assignee: Nidec Corporation, Kyoto (JP)

( * ) Notice: Subject to any disclaimer, the term of this patent is extended or adjusted under 35 U.S.C. 154(b) by 208 days.

(21) Appl. No.: 12/106,406

(22) Filed: Apr. 21, 2008

(65) Prior Publication Data

US 2008/0258585 A1    Oct. 23, 2008

(30) Foreign Application Priority Data

Apr. 23, 2007 (JP) .............................. 2007-112996

(51) Int. Cl.
  *H02K 24/00* (2006.01)
  *G01D 5/245* (2006.01)
(52) U.S. Cl. .............................. 310/168; 310/216.004; 310/216.048; 310/216.049; 324/207.25
(58) Field of Classification Search .......... 310/216.004, 310/216.009, 216.048, 216.049, 216.051
  See application file for complete search history.

(56) References Cited

U.S. PATENT DOCUMENTS

| 5,158,390 | A  | * | 10/1992 | Ito et al. ..................... 403/282 |
| 5,338,996 | A  | * | 8/1994 | Yamamoto ........... 310/216.048 |
| 6,265,802 | B1 | * | 7/2001 | Getschmann ........ 310/216.004 |
| 6,777,843 | B2 |   | 8/2004 | Hayashi et al. |
| 7,183,952 | B1 | * | 2/2007 | Akutsu et al. ............... 341/115 |
| 7,271,519 | B2 | * | 9/2007 | Lee ..................... 310/216.041 |
| 7,646,194 | B2 | * | 1/2010 | Makino ................. 324/207.25 |
| 2005/0040816 | A1 | * | 2/2005 | Ando et al. ............ 324/207.25 |
| 2006/0226719 | A1 | * | 10/2006 | Nakanishi et al. ......... 310/68 B |

FOREIGN PATENT DOCUMENTS

| JP | 2002-39794 A | 2/2002 |
| JP | 2008-275385 | * 11/2008 |

* cited by examiner

*Primary Examiner*—Burton Mullins
(74) *Attorney, Agent, or Firm*—Keating & Bennett, LLP

(57) ABSTRACT

A resolver rotor for a variable reluctance resolver includes a plurality of axially stacked rotor pieces. The rotor pieces are jointly fitted into one body. In the fitting of the rotor pieces, deformed portions are provided between a center of the radial thickness of the resolver rotor and a side surface thereof which is opposite to a stator-side surface thereof. The number of deformed portions is the same as that of projecting poles of the resolver rotor. The deformed portions are arranged at circumferential positions of peaks of the respective projecting poles. At those positions, concave portions are provided on the side surface to receive deformations caused by fitting the rotor pieces together. Thus, the stator-side surface of the resolver rotor is less affected by fitting of the rotor pieces together, preventing a reduction in the detection accuracy of the resolver.

12 Claims, 8 Drawing Sheets

RESOLVER

BACKGROUND OF THE INVENTION

1. Field of the Invention

The present invention relates to a resolver which detects an angular position of an object. The present invention also relates to a motor including such a resolver.

2. Description of the Related Art

Hydraulic power steering is a known system which assists the driver of a vehicle. This system assists the driver with a hydraulic pressure generated by a pump driven by the vehicle's engine. Another system, electric power steering (hereinafter, simply referred to as "EPS"), which provides assistance by driving a motor by the vehicle's battery, has been increasingly used in recent years. The EPS can reduce loss of engine power and is more efficient as compared with hydraulic power steering, and therefore has attracted attention.

The EPS requires an accurate angle detection device which can measure a rotational angle of a motor with high accuracy in order to provide highly accurate control. Moreover, since vehicles are required to precisely work for long periods in various environments, the angle detection device for EPS as one component of the vehicle is required to be highly reliable.

For this reason, a variable reluctance resolver has been used as the angle detection device for EPS because it has high detection accuracy and has higher environmental stability than optical encoders and magnetic encoders. The variable reluctance resolver is arranged so that permeance of a gap formed between a resolver rotor and a resolver stator is sinusoidally changed with rotation of the resolver rotor, and, based on this change, detects the angular position of the resolver rotor or measures the rotation angle thereof. For example, the resolver rotor is arranged in such a shape that the gap permeance is sinusoidally changed with rotation of the resolver rotor. Thus, the shape of the resolver rotor largely affects the detection accuracy of the resolver.

The resolver rotor is usually defined by a plurality of rotor pieces stacked on one another, each of which is formed by punching out an electromagnetic steel plate. The rotor pieces are joined to each other by bonding, deformation, or molding, for example.

In a case where the rotor pieces are joined to each other by being covered by a protection cover formed by resin molding, however, the protection cover increases the manufacturing cost.

In a case where the rotor pieces are joined to each other by adhesive or the like, the adhering force is lowered at some temperatures, causing the rotor pieces to peel off. When the rotor pieces peel off, each rotor piece is displaced and therefore the rotation angle cannot be measured accurately. In order to prevent this, it is necessary to sufficiently consider the endurance of the adhesive. However, this consideration narrows the range of choices for the adhesive material, increasing the manufacturing cost.

In a case of joining the rotor pieces to each other by deformation, a sufficient level of joining strength can be obtained and high reliability can be maintained in various environments. However, deformation may adversely affect the outer shape of the resolver rotor, thus lowering the detection accuracy.

SUMMARY OF THE INVENTION

In order to overcome the problems described above, preferred embodiments of the present invention provide a highly reliable resolver. The resolver preferably includes a resolver stator including a plurality of coil windings and being approximately annular about a center axis; and a resolver rotor rotatable about the center axis relative to the resolver stator and having a first surface and a second surface on both sides thereof in a radial direction perpendicular to or substantially perpendicular to the center axis. The first surface is opposed to the resolver stator with a gap therebetween in the radial direction.

The resolver stator preferably includes a plurality of axially stacked plates and the resolver rotor preferably includes a plurality of axially stacked rotor pieces. At least one of the rotor pieces arranged at axial ends of the resolver rotor has deformed portions which jointly fit the rotor pieces together. The deformed portions are arranged between a center of the radial thickness of the resolver rotor and the second surface.

With this configuration, it is possible to provide a highly reliable resolver without lowering the detection accuracy of a rotation angle.

Other features, elements, advantages and characteristics of the present invention will become more apparent from the following detailed description of preferred embodiments thereof with reference to the attached drawings.

DETAILED DESCRIPTION OF PREFERRED EMBODIMENTS

Figure 1:
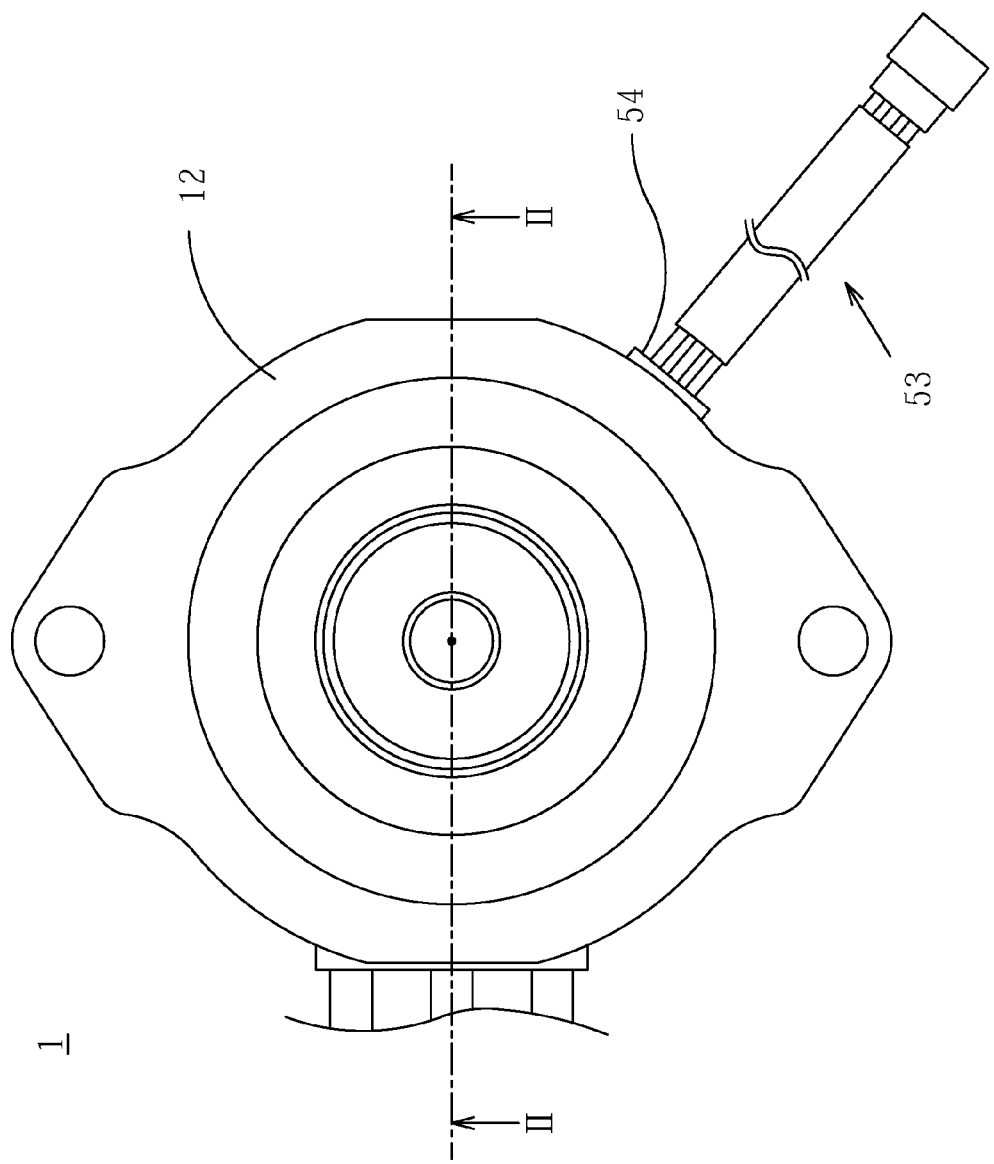
FIG. 1 is a plan view of a motor including a variable reluctance resolver according to a first preferred embodiment of the present invention.

Referring to FIGS. 1 through 8, preferred embodiments of the present invention will be described in detail. It should be noted that in the explanation of preferred embodiments of the present invention, when positional relationships among and orientations of the different components are described as being up/down or left/right, ultimately positional relationships and orientations that are in the drawings are indicated; positional relationships among and orientations of the components once having been assembled into an actual device are not indicated. Additionally, in the following description, an axial direction indicates a direction parallel or substantially parallel to a center axis, and a radial direction indicates a direction perpendicular or substantially perpendicular to the center axis.

First Preferred Embodiment

Figure 2:
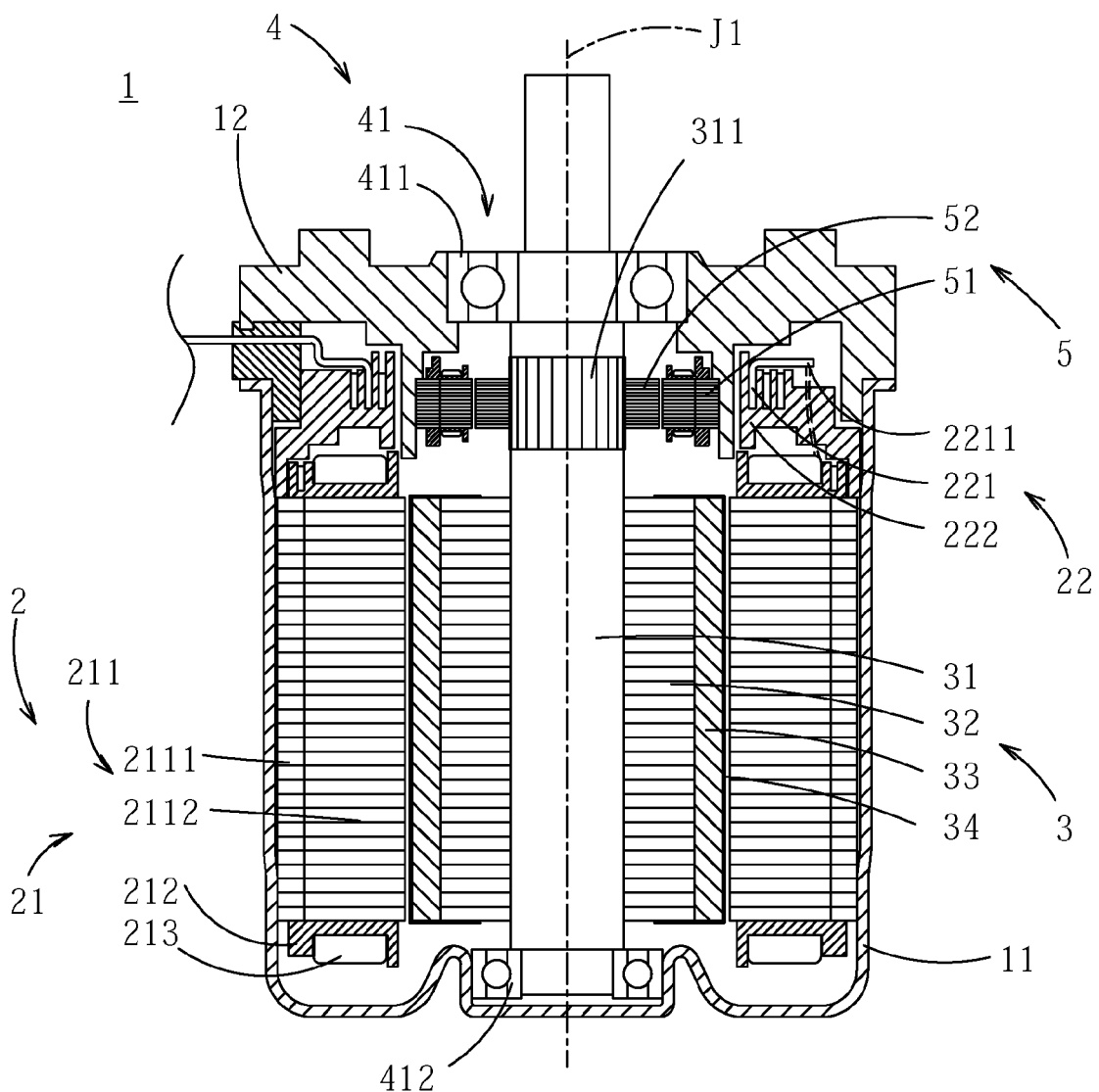
FIG. 2 is a cross-sectional view of the motor according to the first preferred embodiment of the present invention.

A first preferred embodiment is now described referring to FIGS. 1 to 7. FIG. 1 is a plan view of a motor 1, which shows the appearance thereof. FIG. 2 is a cross-sectional view of the motor 1 taken along a plane containing a center axis J1 of the motor 1. In the present preferred embodiment, the motor 1 includes a variable reluctance resolver 5.

Entire Structure of the Motor

The motor 1 is an inner rotor type motor. As shown in FIGS. 1 and 2, the motor 1 includes a motor stator 2, a motor rotor 3, a bearing unit 4 which supports the motor rotor 3 in a rotatable manner about the center axis J1 relative to the motor stator 2, and the variable reluctance resolver 5 as an angle detection device which detects the angular position or measures the rotation angle of the motor rotor 3 relative to the motor stator 2. In the following description, the resolver 5 side is referred to as an upper side in an axial direction parallel to or substantially parallel to the center axis J1, while the motor stator 2 side or the motor rotor 3 side are referred to as a lower side in the axial direction. However, it is not necessary that the center axis J1 be coincident with the direction of gravity.

Referring to FIG. 2, the motor stator 2 includes a hollow housing 11, an armature 21 attached to an inner side surface of the housing 11, a busbar unit 22 attached to the housing 11 above the armature 21 for electrically connecting the armature 21 to an external power supply, and a bracket 12 arranged above the busbar unit 22. In the present preferred embodiment, the housing 11 is approximately cylindrical and open at an axially upper end, and the bracket 12 is an approximately circular plate, for example. The housing 11 and the bracket 12 are provided with ball bearings 41, respectively. The ball bearings 41 support the motor rotor 3 in a rotatable manner relative to the motor stator 2.

The armature 21 includes a stator core 211. The stator core 211 is formed by a plurality of thin plates axially stacked on each other, for example. In the present preferred embodiment, the stator core 211 is formed by thin plates each obtained by punching out a silicon steel plate by pressing. The stator core 211 includes a core back 2111, which is substantially annular, for example, and a plurality of teeth 2112 extending from the core back 2111 toward the center axis J1. The armature 21 also includes an insulator 212 made of an insulating material and covering the surface of the stator core 211, and a plurality of coil windings 213 formed by winding a conductive wire around each tooth 2112 with the insulator 212 arranged therebetween.

The busbar unit 22 includes a plurality of distribution boards 221 which have an approximately circular arcuate shape, for example, and electrically connect the armature 21 to the external power supply (not shown), and a holder 222 which is made of an insulating material, e.g., insulating resin, and holds the distribution board 221. Each distribution board 221 is provided with a plurality of terminals 2211 to be connected to ends of the coil windings 213, respectively.

The motor rotor 3 includes a shaft 31 centered on the center axis J1, a hollow yoke 32 secured around the shaft 31, a rotor magnet 33 which is secured to an outer side surface of the yoke 32 with, for example, an adhesive, and a cover member 34 covering an outer surface of the rotor magnet 33 and preventing separation of the rotor magnet 33 from the yoke 32. The cover member 34 is made of non-magnetic material, for example. In the present preferred embodiment, the yoke 32 is approximately cylindrical about the center axis J1, and is formed by a plurality of thin plates axially stacked on each other. Each of the thin plates of the yoke 32 is obtained by punching out a silicon steel plate by pressing. In the motor 1, the rotor magnet 33 is arranged on the center-axis J1 side of the armature 21 and a torque centered on the center axis J1 is generated between the armature 21 and the rotor magnet 33.

The bearing unit 4 includes an upper ball bearing 411 attached to an inner side surface of the bracket 12 and a lower ball bearing 412 attached to the bottom of the housing 11. The shaft 31 is supported by the upper and lower ball bearings 411 and 412 in a rotatable manner.

The resolver 5 includes a resolver stator 51 which is approximately annular about the center axis J1, for example, and a resolver rotor 52 secured to the shaft 31 above the yoke 32 on the center-axis J1 side of the resolver stator 51. To the resolver stator 51 is connected a lead wire 53 (see FIG. 1). The lead wire 53 is arranged to extend via a rubber bushing 54 arranged between the housing 11 and the bracket 12 to the outside of the motor 1.

Structure of the Resolver

Figure 3:
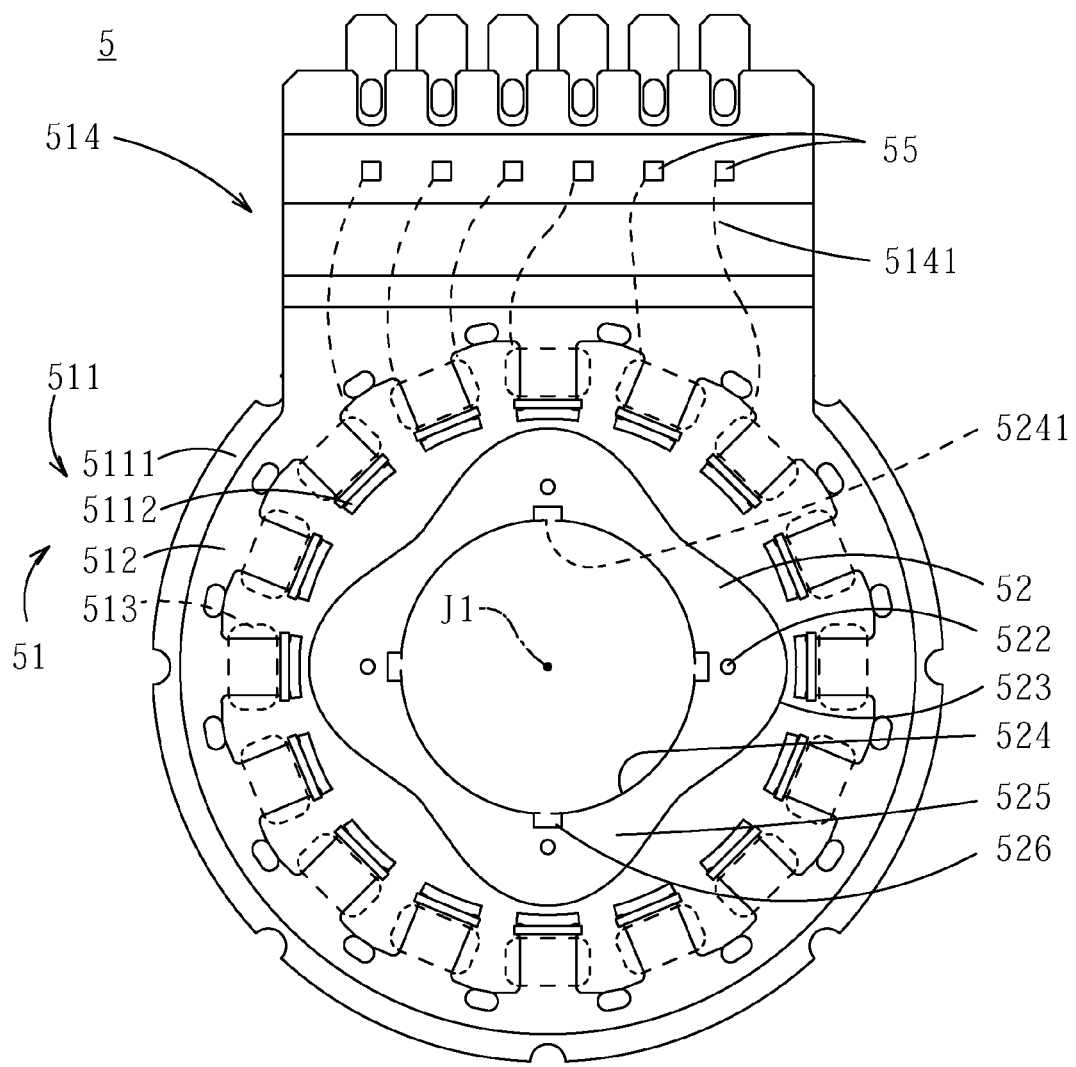
FIG. 3 is a plan view of the resolver according to the first preferred embodiment of the present invention.
Figure 4:
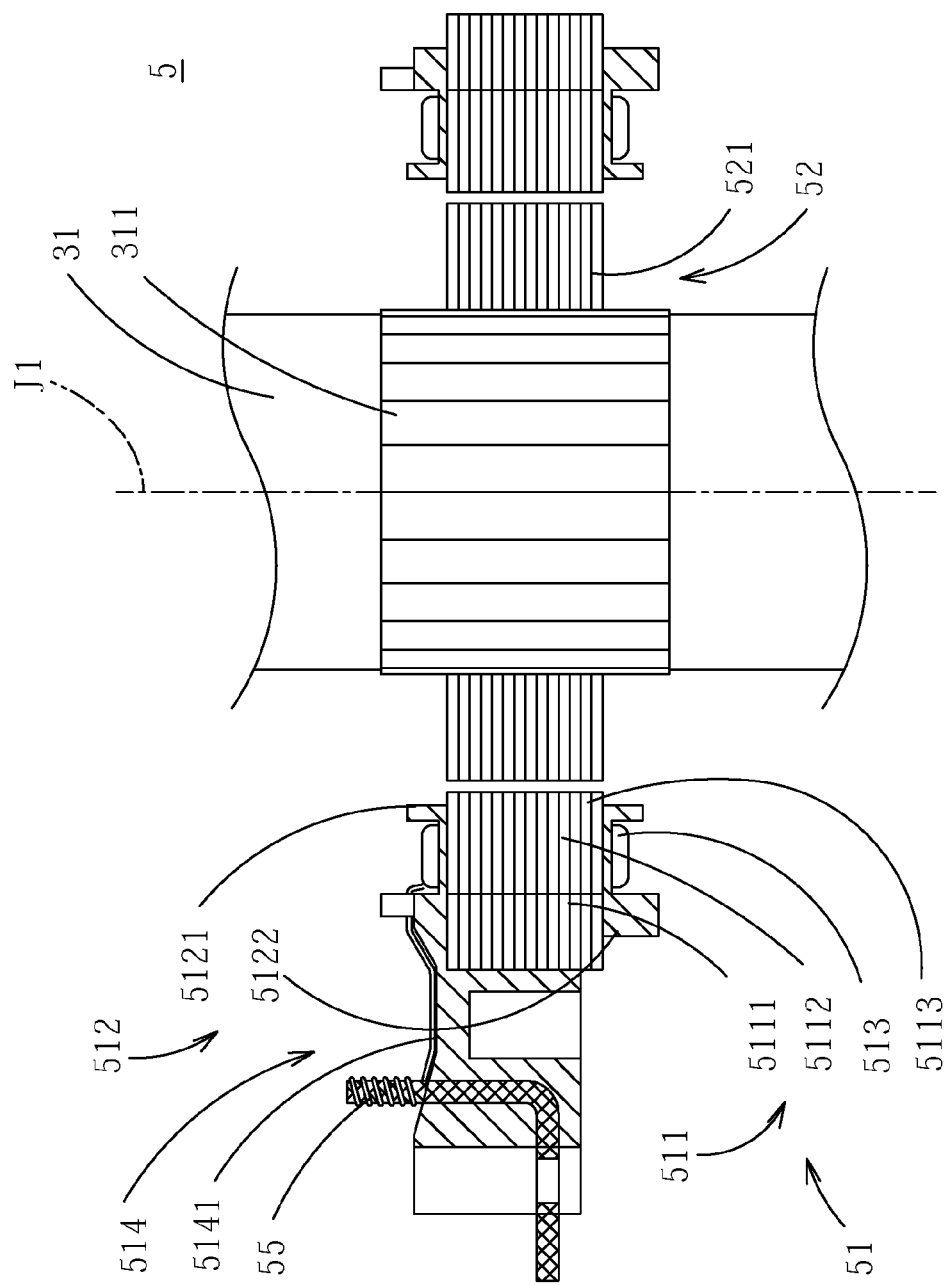
FIG. 4 is a cross-sectional view of the resolver according to the first preferred embodiment of the present invention.

The entire structure of the resolver 5 is now described referring to FIGS. 3 and 4. FIG. 3 is a plan view of the resolver 5 which shows the appearance thereof. FIG. 4 is a cross-sectional view of the resolver 5 taken along a plane containing the center axis J1.

The resolver stator 51 is centered on the center axis J1 and includes a resolver stator core 511 secured to the inner side surface of the bracket 12. The resolver stator core 511 is formed by a plurality of thin plates 5113 axially stacked on each other and each obtained by punching out a silicon steel plate by pressing, for example. The thin plates 5113 are stacked on each other so that each thin plate 5113 is displaced around the center axis J1 from an adjacent one by a predetermined angle. In the present preferred embodiment, the thin plates 5113 are axially stacked so that each thin plate 5113 is displaced from an adjacent thin plate 5113 by about 45 degrees around the center axis J1. The reason for this displacing arrangement is now described. In the present preferred embodiment, the resolver stator core 511 is formed by silicon steel plates which do not have magnetic directionality. However, even in a case of using such a material, small magnetic directionality may be provided to the material because of the effects of processing, or there may be a small difference in the thickness of the silicon steel plate. The aforementioned displacing arrangement can overcome these problems. That is, when the thin plates 5113 are displaced about the center axis J1 from each other by a predetermined angle, the thickness differences cannot accumulate at a certain angular position and the magnetic directionality can be averaged. Thus, the resolver stator core 511 having excellent magnetic characteristics can be obtained.

The resolver stator core 511 includes a substantially annular core back 5111 and a plurality of teeth 5112 extending from the core back 5111 toward the center axis J1. The resolver stator 51 further includes an insulator 512 made of an insulating material and covering the surface of the resolver stator core 511, and a plurality of coil windings 513 formed by winding a conductive wire around each tooth 5112 with the insulator 512 arranged therebetween. In the resolver 5, the coil windings 513 are a group of one-phase excitation coil windings and two-phase output coil windings.

As shown in FIG. 4, the insulator 512 includes an upper insulator portion 5121 and a lower insulator portion 5122 which cover the teeth 5112 from axially above and from axially below, respectively. Each of the upper insulator portion 5121 and the lower insulator portion 5122 is preferably formed by injection molding of resin, for example. The upper insulator portion 5121 is provided with a terminal block 514 formed integrally therewith. The terminal block 514 projects outward from the resolver stator core 511 in a radial direction perpendicular to or substantially perpendicular to the center axis J1. The terminal block 514 has an upper surface 5141 and a plurality of terminal pins 55 projecting outward in the radial direction. Each terminal pin 55 has an approximately L-shaped cross section. An end of each terminal pin 55 is connected to the lead wire 53 by welding or the like.

The resolver rotor 52 is secured to the shaft 31 and rotates together with the shaft 31 as one unit. More specifically, a portion 311 of the shaft 31, to which the resolver rotor 52 is fixed, is knurled. That is, the knurled portion 311 has a fine pattern of convex portions and concave portions which are alternately arranged in a circumferential direction thereof. The resolver rotor 52 is fixed to the shaft 31 so as to be in contact with the convex portions of the knurled portion 311. In other words, the resolver rotor 52 is fixed to the shaft 31 by press fitting. The knurled portion 311 of the shaft 31 can firmly fix the resolver rotor 52 to the shaft 31 and can also stop rotation of the resolver rotor 52 around the shaft 31 when the resolver rotor 52 and the shaft 31 rotate together.

Detailed Structure of the Resolver Rotor

Figure 5:
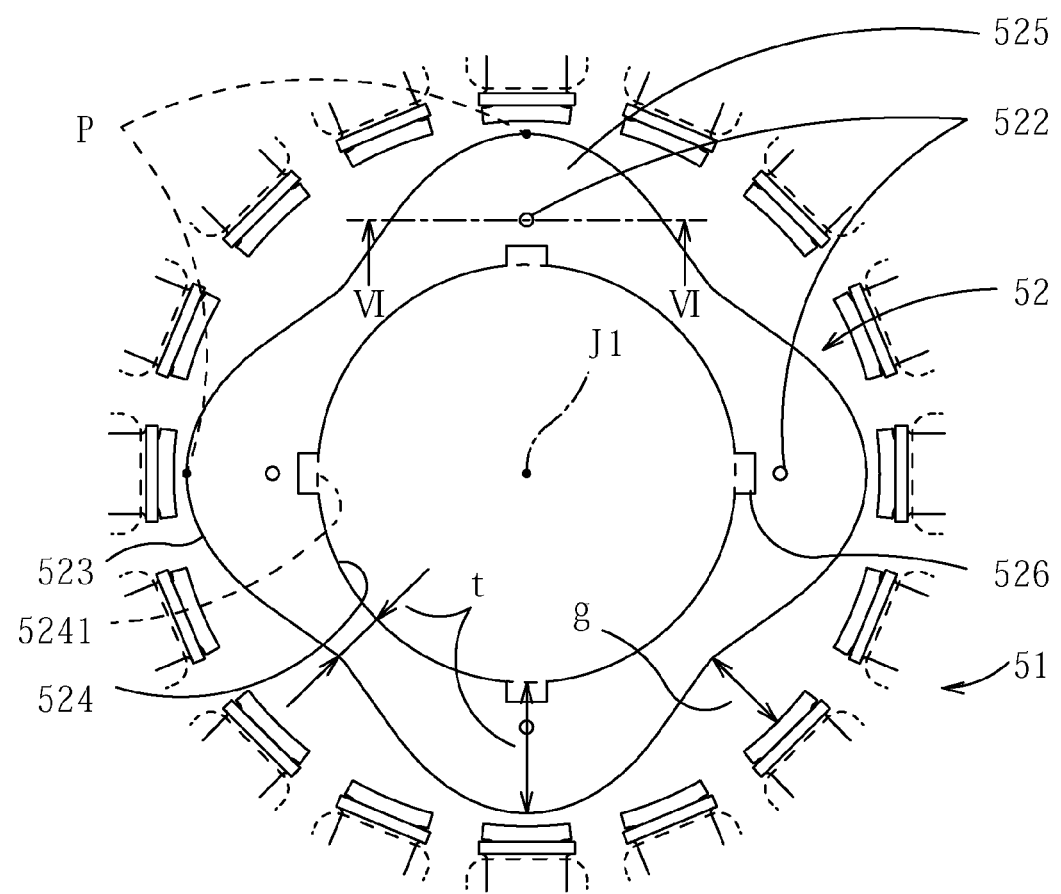
FIG. 5 schematically shows a portion of a resolver stator and a resolver rotor according to the first preferred embodiment of the present invention.

The structure of the resolver rotor 52 in the present preferred embodiment is now described in detail. FIG. 5 is an enlarged view of the resolver rotor 52 and a portion of the resolver stator 51.

Figure 6:
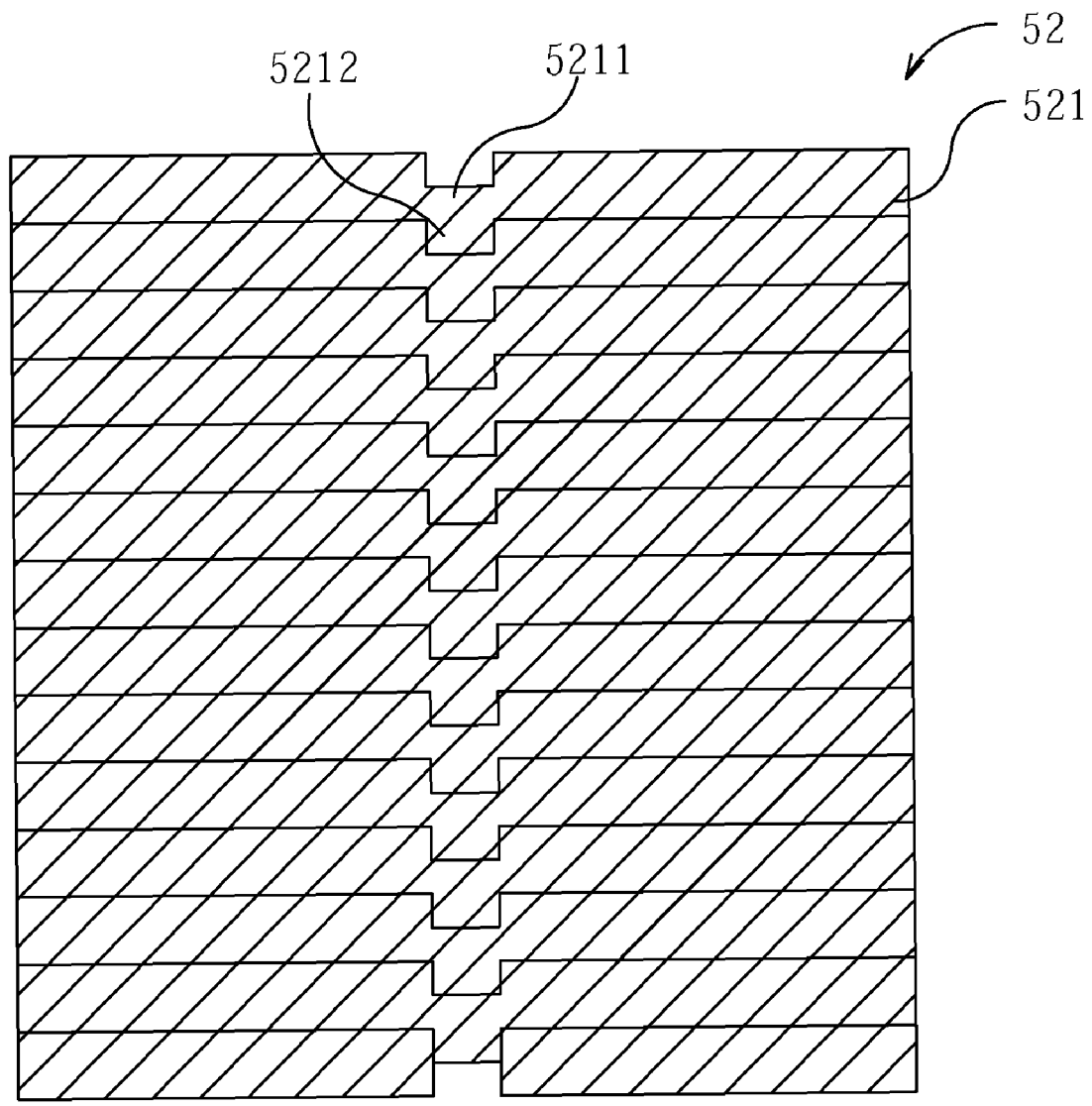
FIG. 6 is a cross-sectional view of a plurality of stacked rotor pieces forming the resolver rotor.

The resolver rotor 52 is formed by rotor pieces 521 axially stacked on each other, each of which is obtained by punching out a silicon steel plate by pressing, for example. As shown in FIG. 6, a portion 5211 is depressed in each rotor piece 521 by pressing. Thus, on the rear surface of each rotor piece 521, a projection 5212 is formed at a position corresponding to the depressed portion 5211. When the rotor pieces 521 are stacked on each other, the projection 5212 of each rotor piece 521 is press-fitted into the depressed portion 5211 of an adjacent rotor piece 521 to define a deformed portion 522 which jointly fits the rotor pieces 521 as one body. In this manner, the resolver rotor 52 is formed. Please note that the projection 5212 is not provided in an axially lowermost rotor piece 521. Instead, a through hole is formed at the position corresponding to the projection 5212 of an axially adjacent rotor piece 521. With this configuration, the projection 5212 of the next lowermost rotor piece 521 is accommodated in the through hole of the lowermost rotor piece 521.

Figure 7:
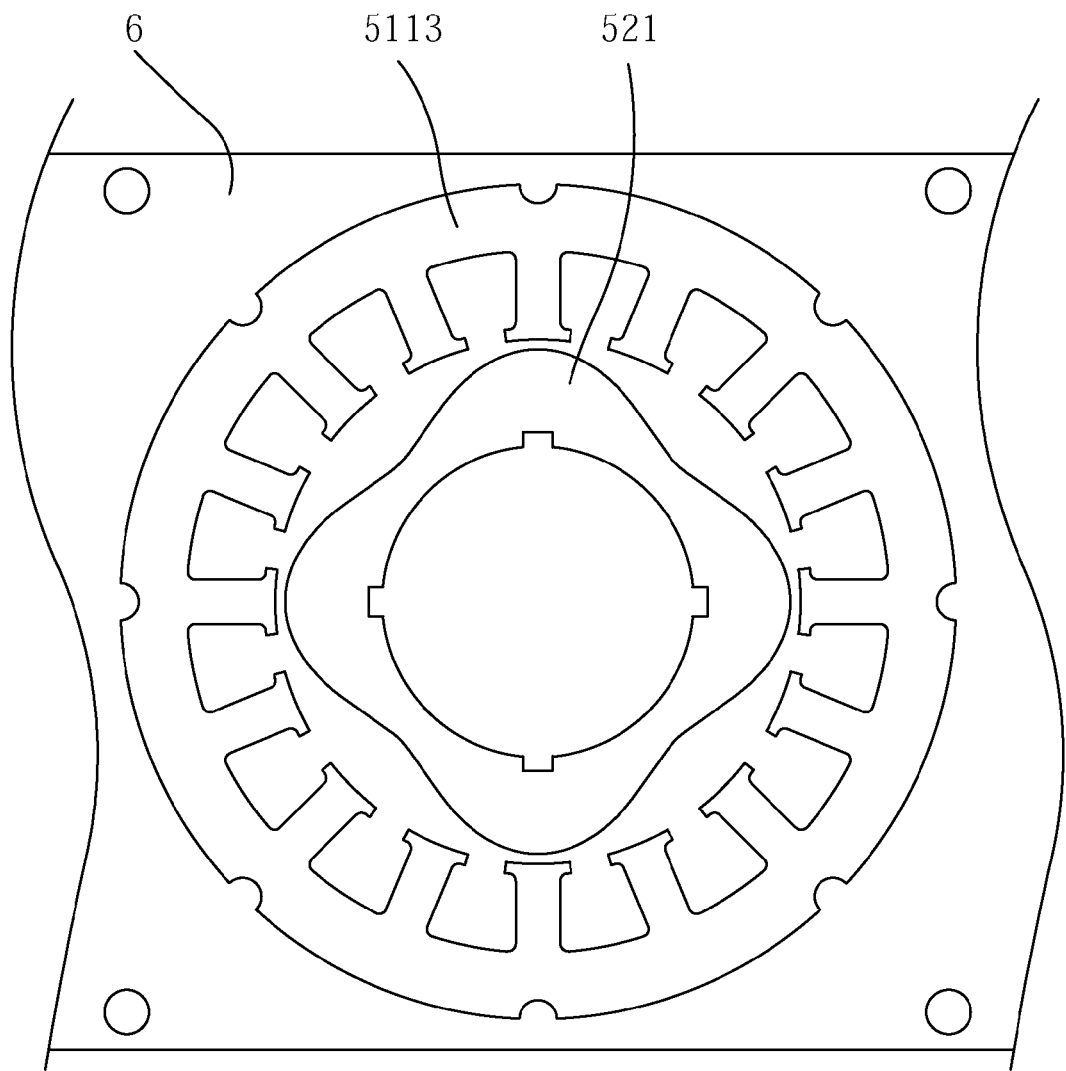
FIG. 7 illustrates an exemplary arrangement of the resolver stator and the resolver rotor on a sheet according to the first preferred embodiment of the present invention.

Referring to FIG. 7, each of the thin plates 5113 forming the resolver stator 51 and a corresponding one of the rotor pieces 521 forming the resolver rotor 52 are formed by punching out the same sheet of silicon steel 6 by pressing, for example. When the sheet is punched out, each thin plate 5113 and the corresponding rotor piece 521 are arranged in that sheet as if they are in an actual resolver 5. This arrangement and simultaneous formation of each thin plate 5113 and the corresponding rotor piece 521 can increase the numbers of the thin plates 5113 and the number of the rotor pieces 521 which can be obtained from a single sheet. Thus, the material of the resolver stator 51 and the resolver rotor 52 can be used more efficiently and the manufacturing cost can be reduced.

The resolver rotor 52 has a stator-side surface 523 and a side surface 524 on both sides thereof in the radial direction. The stator-side surface 523 is opposed to the resolver stator 51 with a gap therebetween in the radial direction. The stator-side surface 523 has four projecting poles 525 which project outward in the radial direction. More specifically, the stator-side surface 523 has raised portions and depressed portions both of which are rounded. The raised portions and the depressed portions are alternately arranged in the circumferential direction of the stator-side surface 523 and the raised portions define the projecting poles 525, respectively. The side surface 524 has a concave portion 526 which is concave toward the stator-side surface 523 at a circumferential position corresponding to a peak P of each projecting pole 525. In the present preferred embodiment, each concave portion 526 is a groove extending along the center axis J1 and being open at both axial ends of the resolver rotor 52.

In the resolver rotor 52, a plurality of deformed portions 522 are formed at the circumferential positions corresponding to the peaks P of the projecting poles 525, respectively. At those circumferential positions, the size of the gap g between the resolver stator 51 and the resolver rotor 52 is the smallest. Moreover, the deformed portions 522 are arranged between a center of the radial thickness t of the resolver rotor 52 and the side surface 524. Please note that the radial thickness t of the resolver rotor 52 is the dimension between the side surface 524 and the stator-side surface 523. However, at the circumferential position where the concave portion 526 is formed on the side surface 524, an imaginary plane 5241 extends from the side surface 524, which is shown with a broken line in FIG. 5, and the stator-side surface 523.

With this structure of the resolver rotor 52, the stator-side surface 523 is less affected by deformation of the resolver rotor 52 for jointly fitting the rotor pieces 521 together. Thus, the resolver 5 can have a higher detection accuracy. Moreover, since the number of the deformed portions 522 is the same as the number of the projecting poles 525, the rotor pieces 521 are firmly joined to each other. In addition, deformation for jointly fitting the rotor pieces 521 together is received by the concave portions 526 of the side surface 524. This makes it possible to press-fit the resolver rotor 52 to the shaft 31 without being affected by deformation. Accordingly, a resolver 5 can be provided which has higher detection accuracy, is more reliable, and can be assembled easily at a lower cost.

Second Preferred Embodiment

Figure 8:
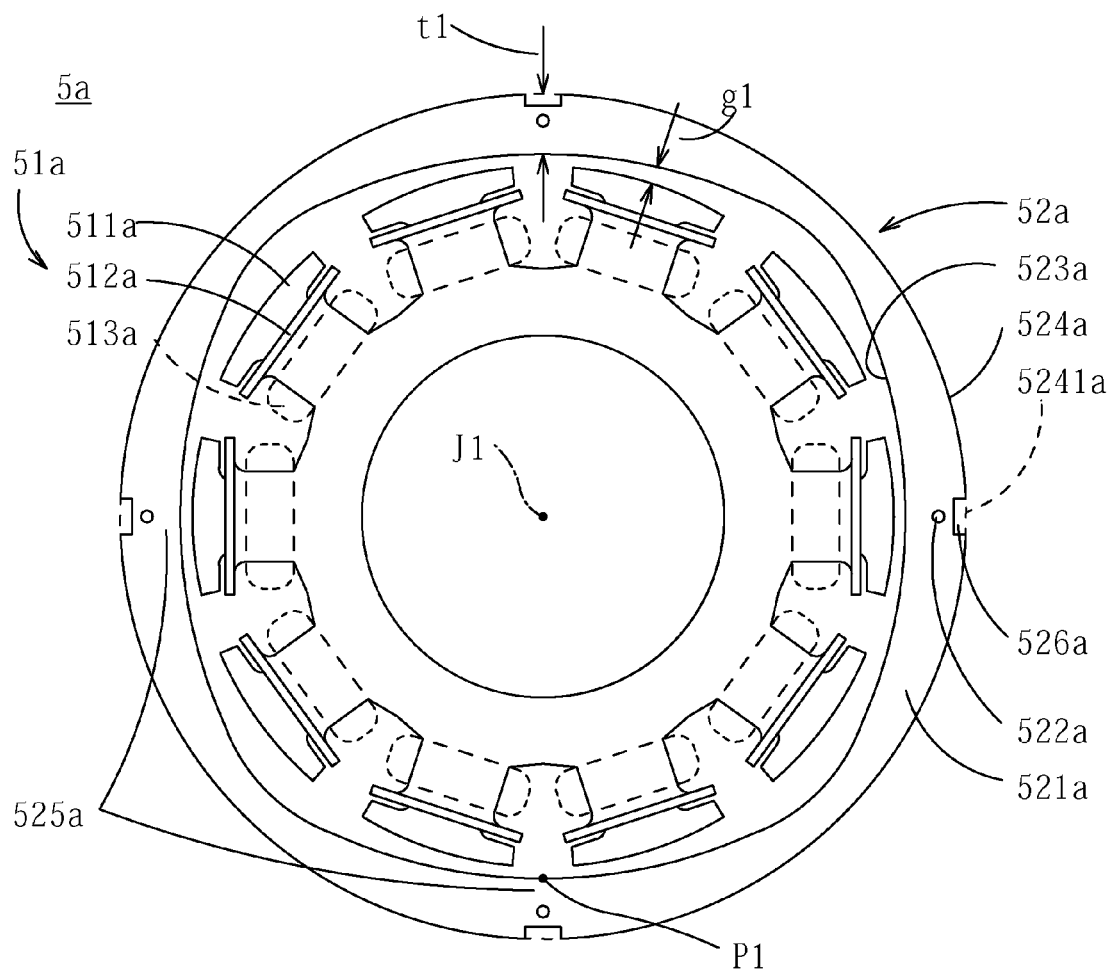
FIG. 8 is a plan view of a resolver according to a second preferred embodiment of the present invention.

A second preferred embodiment of the present invention is now described referring to FIG. 8. FIG. 8 is a plan view of a resolver 5a according to the second preferred embodiment of the present invention. The resolver 5a of the present preferred embodiment is an outer rotor type whereas the resolver 5 of the first preferred embodiment is an inner rotor type. Thus, the resolver 5a is different from the resolver 5 in the positional relationship between a resolver stator and a resolver rotor. Except for the above, the resolver 5a of the second preferred embodiment is substantially the same as the resolver 5 of the first preferred embodiment. Therefore, like components are given like reference signs with "a" added and the detailed description thereof is omitted.

Detailed Structure of the Resolver Rotor

As shown in FIG. 8, in the resolver 5a, the resolver rotor 52a is arranged radially outside the resolver stator 51a so as to be opposite to the resolver stator 51a with a radial gap therebetween. Thus, the resolver rotor 52a has a stator-side surface 523a as a radially inner surface and a side surface 524a as a radially outer surface. The resolver stator 51a also includes a resolver stator core 511a, an insulator 512a, and a plurality of coil windings 513a. The resolver rotor 52a of the present preferred embodiment is formed by a plurality of rotor pieces 521a axially stacked on each other, each of which is manufactured by punching out a silicon steel plate by pressing, for example, as in the first preferred embodiment. When the stacked rotor pieces 521a are joined to each other as one body, an axial force is applied thereto so as to form the deformed portions 522a, as in the first preferred embodiment. The joined rotor pieces 521a serve as the resolver rotor 52a. The stator-side surface 523a of the resolver rotor 52a has four projecting poles 525a which project radially inward. More specifically, the stator-side surface 523a has raised portions and depressed portions which are both rounded and are arranged alternately in the circumferential direction of the stator-side surface 523a. Each raised portion forms the projecting pole 525a. The side surface 524a is provided with a concave portion 526a which is concave toward the stator-side surface 523a at a circumferential position corresponding to a peak P1 of each projecting pole 525a. In the resolver 5a of the present preferred embodiment, the concave portions 526a are grooves each extending along the center axis J1 and being open at both axial ends of the resolver rotor 52a.

The deformed portions 522a in the resolver rotor 52a are formed at the circumferential positions corresponding to the peaks P1 of the respective projecting poles 525a, i.e., at the circumferential positions at which a radial gap g1 between the resolver stator 51a and the resolver rotor 52a is the smallest and which is between the side surface 524a and a center of the radial thickness t1 of the resolver rotor 52a. Please note that the radial thickness t1 of the resolver rotor 52a is the dimension between the side surface 524a and the stator-side surface 523a. At the circumferential position where the concave portion 526a is formed on the side surface 524a, the radial thickness t1 is the dimension between the stator-side surface 523a and an imaginary surface 5241a extending from the side surface 524a which is shown with a broken line in FIG. 8.

With this configuration of the resolver rotor 52a, the stator-side surface 523a is less affected by deformation for jointly fitting of the rotor pieces 521a together. Thus, the resolver 5a can have a higher detection accuracy. In addition, since the number of the deformed portions 522a and the number of projecting poles 525a are the same, the rotor pieces 521a are firmly joined to each other as one body. Moreover, the effects of deformation for jointly fitting of the rotor pieces 521a are received in the concave portions 526a in the resolver rotor 52a of the present preferred embodiment. Thus, it is possible to press-fit the resolver rotor 52a to a motor rotor (not shown) without being affected by deformation for jointly fitting of the rotor pieces 521a together. Accordingly, the resolver 5a can be provided which has a higher detection accuracy, is highly reliable, and can be easily assembled at a lower cost.

Although the first and second preferred embodiments of the present invention are described above, the present invention is not limited thereto but can be modified in various ways.

For example, the number of the projecting poles in the resolver rotor of any of the aforementioned preferred embodiments is not limited to four. The number of the projecting poles can be any integer larger than one.

In the resolver of the aforementioned preferred embodiments, only the resolver stator core is formed by stacking a plurality of plates or sheets so that they are angularly displaced from each other. However, the structure of the resolver is not limited thereto. Both the resolver stator core and the resolver rotor may be formed by stacking the plates or sheets so that they are angularly displaced from each other.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A resolver comprising:
a resolver stator including a plurality of coil windings, the resolver stator being approximately annular about a center axis; and
a resolver rotor rotatable about the center axis relative to the resolver stator and including a first surface and a second surface on opposing radial sides thereof, the first surface being opposed to the resolver stator with a gap therebetween in the radial direction; wherein
the resolver stator includes a plurality of axially stacked plates and the resolver rotor includes a plurality of axially stacked rotor pieces;
at least one of the plurality of axially stacked rotor pieces of the resolver rotor arranged at an axial end of the resolver rotor includes deformed portions which jointly fit into an adjacently positioned one of the plurality of axially stacked rotor pieces such that the rotor pieces are aligned together, and the deformed portions are arranged between an approximate center of a radial thickness of the resolver rotor and the second surface; and
the second surface of the resolver rotor includes concave portions at circumferential positions corresponding to the deformed portions.

2. The resolver according to claim 1, wherein the deformed portions are arranged at circumferential positions at which the radial thickness of the resolver rotor is the largest.

3. The resolver according to claim 2, wherein the first surface of the resolver rotor includes a plurality of projecting poles projecting in the radial direction, and a number of the projecting poles is the same as a number of the deformed portions.

4. The resolver according to claim 1, wherein the concave portions axially extend and open at both axial ends of the resolver rotor.

5. An electric motor comprising:
the resolver according to claim 1;
a motor stator including an armature;
a motor rotor including a field-generating magnet which is arranged to generate with the armature a torque about the center axis; and
a bearing unit arranged to support the motor rotor in a rotatable manner about the center axis relative to the motor stator; wherein
the resolver rotor is fixed to the motor rotor by contact between the second surface of the resolver rotor and the motor rotor.

6. The motor according to claim 5, wherein the motor rotor includes a shaft extending axially, and the resolver rotor is fixed to the motor rotor by contact between the second surface of the resolver rotor and the shaft.

7. The motor according to claim 6, wherein the shaft includes a knurled portion at a position to which the second surface of the resolver rotor is fixed, the knurled portion including a plurality of concave portions and a plurality of convex portions alternately arranged in a circumferential direction of the shaft.

8. An electric motor comprising:
a resolver including:
a resolver stator including a plurality of coil windings and being approximately annular about a center axis; and
a resolver rotor rotatable about the center axis relative to the resolver stator and including a first surface and a second surface on opposing radial sides thereof, the first surface being opposed to the resolver stator with a gap therebetween in the radial direction;
a motor stator including an armature;
a motor rotor including a field-generating magnet which is arranged to generate with the armature a torque about the center axis; and a bearing unit arranged to support the motor rotor in a rotatable manner about the center axis relative to the motor stator; wherein the resolver stator includes a plurality of axially stacked plates and the resolver rotor includes a plurality of axially stacked rotor pieces;

at least one of the plurality of axially stacked rotor pieces of the resolver rotor arranged at an axial end of the resolver rotor includes deformed portions which jointly fit into an adjacently positioned one of the plurality of axially stacked rotor pieces such that the rotor pieces are aligned together, and the deformed portions are arranged between an approximate center of a radial thickness of the resolver rotor and the second surface;

the second surface of the resolver rotor includes concave portions at circumferential positions corresponding to the deformed portions;

the motor rotor includes a shaft extending axially, and the resolver rotor is fixed to the motor rotor by contact between the second surface of the resolver rotor and the shaft; and the shaft includes a knurled portion at a position to which the second surface of the resolver rotor is fixed, the knurled portion including a plurality of concave portions and a plurality of convex portions alternately arranged in a circumferential direction of the shaft.

9. The electric motor according to claim 8, wherein the concave portions axially extend and open at both axial ends of the resolver rotor.

10. The electric motor according to claim 8, wherein the deformed portions are arranged at circumferential positions at which the radial thickness of the resolver rotor is the largest.

11. The electric motor according to claim 10, wherein the first surface of the resolver rotor includes a plurality of projecting poles projecting in the radial direction, and a number of the projecting poles is the same as a number of the deformed portions.

12. A resolver comprising:

a resolver stator including a plurality of coil windings, the resolver stator being approximately annular about a center axis; and a resolver rotor rotatable about the center axis relative to the resolver stator and including a first surface and a second surface on opposing radial sides thereof, the first surface being opposed to the resolver stator with a gap therebetween in the radial direction and including four projection poles arranged to project in the radial direction; wherein the resolver stator includes a plurality of axially stacked plates and the resolver rotor includes a plurality of axially stacked rotor pieces;

at least one of the plurality of axially stacked rotor pieces of the resolver rotor arranged at an axial end of the resolver rotor includes deformed portions which jointly fit into an adjacently positioned one of the plurality of axially stacked rotor pieces such that the rotor pieces are aligned together, and the deformed portions are arranged between an approximate center of a radial thickness of the resolver rotor and the second surface;

the second surface of the resolver rotor includes concave portions at circumferential positions corresponding to the deformed portions, each of the concave portions being arranged between two respective radially inward projecting portions; and the concave portions have a smaller circumferential width than the radially inward projecting portions.

* * * * *